(12) United States Patent
Komiya

(10) Patent No.: US 8,593,439 B2
(45) Date of Patent: Nov. 26, 2013

(54) LOAD DRIVING DEVICE, ILLUMINATION DEVICE, DISPLAY DEVICE

(71) Applicant: Rohm Co., Ltd., Kyoto (JP)

(72) Inventor: Kunihiro Komiya, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 13/713,873

(22) Filed: Dec. 13, 2012

(65) Prior Publication Data

US 2013/0100377 A1  Apr. 25, 2013

Related U.S. Application Data

(63) Continuation of application No. 12/543,548, filed on Aug. 19, 2009, now Pat. No. 8,355,111.

(30) Foreign Application Priority Data

Aug. 20, 2008 (JP) .................................. 2008211310

(51) Int. Cl.
*G06F 3/038* (2013.01)
*G09G 5/00* (2006.01)
*G02F 1/13* (2006.01)

(52) U.S. Cl.
USPC ............................ 345/204; 345/691; 349/187

(58) Field of Classification Search
USPC ................................... 345/204, 691; 349/187
See application file for complete search history.

(56) References Cited

U.S. PATENT DOCUMENTS

2010/0090530 A1 * 4/2010 Watanabe ........................ 307/37

FOREIGN PATENT DOCUMENTS

JP  2008-061482  3/2008

* cited by examiner

*Primary Examiner* — Phu Vu
(74) *Attorney, Agent, or Firm* — Fish & Richardson P.C.

(57) ABSTRACT

A load driving device according to the present invention is provided with: an enabling control section generating an enabling signal from an externally inputted PWM signal; and a load driving section that is turned on/off according to the enabling signal, and that PWM-drives the load according to the PWM signal.

16 Claims, 9 Drawing Sheets

LOAD DRIVING DEVICE, ILLUMINATION DEVICE, DISPLAY DEVICE

CROSS-REFERENCE TO RELATED APPLICATION(S)

This application is a continuation of U.S. Ser. No. 12/543,548, filed Aug. 19, 2009, which in turn claims the benefit of Japanese Application No. 2008-211310, filed Aug. 20, 2008.

BACKGROUND OF THE INVENTION

1. Field of the Invention

The present invention relates to a load driving device capable of achieving, by using a single external control signal, both on/off control of the device itself and PWM (pulse width modulation) driving of a load. For example, the present invention relates to an LED (light emitting diode) driver IC supplying a drive current to an LED, and an illumination device and a display device using this.

2. Description of Related Art

FIG. 7 is a block diagram showing a conventional example of an LED driver IC. As shown in the figure, the conventional LED driver IC is configured such that an enabling signal EN for performing on/off control of the LED driver IC is PWM-driven, to thereby PWM-drive a drive current Io that is supplied to an LED from an LED driver section, and thus to control the brightness of an LED (i.e., control a mean value of the drive current Io).

In other words, the LED driver IC of this conventional example is configured such that an enabling signal EN for performing on/off control of the LED driver IC itself and a brightness control signal PWM for controlling the brightness of an LED by PWM driving are combined into a single external control signal.

An example of conventional technologies that the present invention pertains is disclosed, for example, in JP-A-2008-61482 (hereinafter, Patent Document 1).

It is true that, with the above described conventional LED driver IC, since it is possible to achieve, by using a single external control signal, both on/off control of the LED driver IC itself and brightness control of the LED by PWM driving, the number of pins can be reduced.

However, with the above-described conventional LED driver IC, since it is configured such that the brightness control of the LED is performed by turning on/off the LED driver IC itself, internal circuits integrated on the LED driver IC are all started over from an off state each time the enabling signal EN is raised from low to high level.

Thus, with the above-described conventional LED driver IC, between the time when the enable signal EN is raised to high level and the time when the drive current Io supplied to the LED rises up to a desired current value, there arises a time delay d (see FIG. 8) associated with start-up of a reference voltage supply, a reference current supply, and the like that form the LED driver section (in particular, rising-up of a reference voltage Vref).

This time delay d makes it impossible to obtain a drive current Io corresponding to the on-duty (ratio of a high level period with respect to a cycle T in PWM driving) of the enabling signal EN. As a result, with the above-described conventional LED driver IC, as indicated by a dash-dot line and a dash-dot-dot line in FIG. 9, a relation between the on-duty of the enabling signal EN and the drive current Io is more deviated from an ideal one (see a solid line in FIG. 9) with increase in frequency $f(=1/T)$ of PWM driving, and this invites degradation in linearity, and reduction in dynamic range, of PWM driving.

Incidentally, the above problems can be solved with a configuration in which the enabling signal EN and the brightness control signal PWM are independently inputted, but, inconveniently, such a configuration requires an increased number of pins.

The above description deals with an LED driver IC as an example to describe the problems that the present invention intends to overcome, but these problems are common to load driving devices in general that achieve both on/off control of the devices themselves and PWM driving of loads by using a single external control signal.

SUMMARY OF THE INVENTION

In view of the above problems, an object of the present invention is to provide a load driving device capable of achieving, by using a single external control signal, both on/off control of the device itself and PWM driving of a load without inviting degradation in linearity, or reduction in dynamic range, of PWM driving, and an illumination device and a display device using this.

To achieve the above object, according to one aspect of the present invention, a load driving device is provided with: an enabling control section generating an enabling signal from an externally inputted PWM signal; and a load driving section that is turned on/off according to the enabling signal and that PWM-drives the load according to the PWM signal.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Hereinafter, a detailed description will be given, dealing with a case in which the present invention is applied to an LED driver IC.

Figure 1:
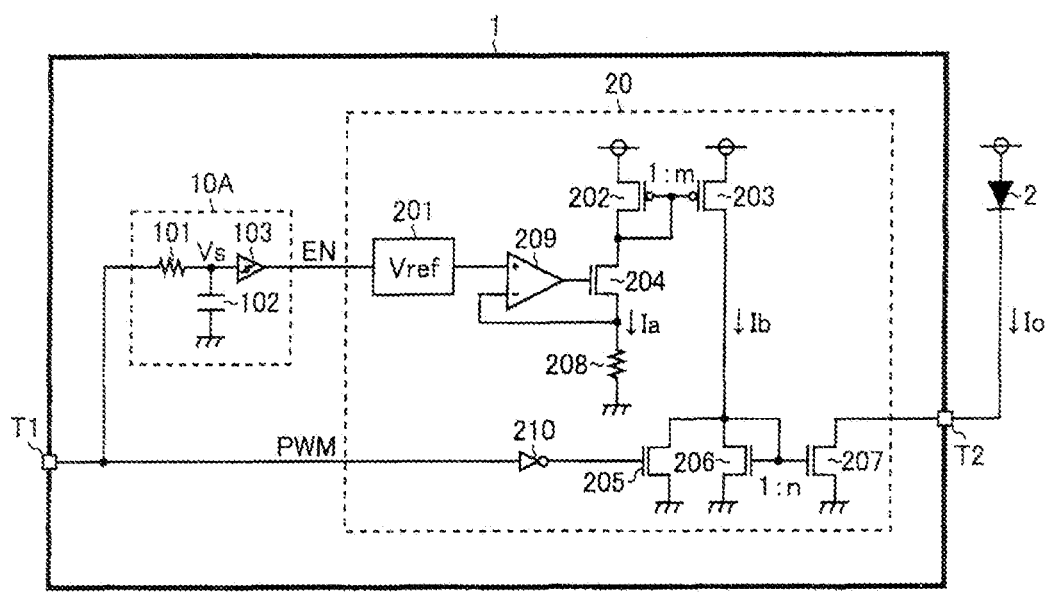
FIG. 1 is a circuit block diagram showing a first embodiment of a display device according to the present invention.

First, a first embodiment of a display device according to the present invention will be described in detail with reference to FIG. 1. FIG. 1 is a circuit block diagram showing the first embodiment of the display device according to the present invention, and the figure shows the LED driver IC and vicinity thereof as a part particularly related to the present invention.

The display device of this embodiment is provided with an LED driver IC 1, an LED 2 that receives a drive current Io from the LED driver IC 1 and emits light, and a liquid crystal panel (not shown) that is illuminated by the LED 2 at its back or side surface.

The LED driver IC 1 is provided with: an enabling control section 10A that generates an enabling signal EN from a brightness control signal PWM that is externally inputted thereto via a pin T1; and an LED driver section 20 that is turned on/off according to the enabling signal EN, and PWM-drives the LED 2 according to the brightness control signal PWM. Incidentally, the above-mentioned brightness control signal PWM is a pulse signal subjected to pulse width modulation according to a brightness value of the LED 2.

In this embodiment, the enabling control section 10A is so configured as to generate a smooth voltage Vs from the brightness control signal PWM by using a smoothing circuit composed of a resistor 101 and d capacitor 102, and pass this smooth voltage Vs through a buffer 103 so as to generate the enabling signal EN. However, this is not meant to limit the configuration of the smoothing circuit, and a circuit configuration other than this may be adopted. In FIG. 1, a Schmitt buffer having a hysteresis property is used as the buffer 103, but instead, a buffer without a hysteresis property may be used, or, an inverter or a comparator may be used as the buffer 103.

Thus, the LED driver IC 1 is configured such that a single pin T1 functions both as a brightness control terminal and as an enabling terminal, and furthermore, such that a signal path of the brightness control signal PWM and a signal path of the enabling signal EN are separate from each other inside the IC.

The LED driver section 20 is provided with: a reference voltage generating circuit 201; P-channel MOS (metal oxide semiconductor) field-effect transistors 202 and 203; N-channel MOS field-effect transistors 204 to 207; a resistor 208 (resistance: R); an operational amplifier 209; and an inverter 210.

The reference voltage generating circuit 201 is means for generating a predetermined reference voltage Vref, and is allowed to generate, or prohibited from generating, the reference voltage Vref according to the enabling signal EN. More specifically, the reference voltage generating circuit 201 is in an operating state (state in which it is allowed to generate the reference voltage Vref) when the enabling signal EN is high level, and the reference voltage generating circuit 201 is in a non-operating state (state in which it is prohibited from generating the reference voltage Vref) when the enabling signal EN is low level.

Sources of the transistors 202 and 203 are both connected to a power supply terminal. Gates of the transistors 202 and 203 are both connected to a drain of the transistor 202. The drain of the transistor 202 is connected to a drain of the transistor 204. A source of the transistor 204 is connected to a ground terminal via the resistor 208. A non-inverting input terminal (+) of the operational amplifier 209 is connected to a reference voltage Vref application terminal (i.e., an output terminal of the reference voltage generating circuit 201). An inverting input terminal (−) of the operational amplifier 209 is connected to the source of the transistor 204. An output terminal of the operational amplifier 209 is connected to a gate of the transistor 204. A drain of the transistor 203 is connected to drains of the transistors 205 and 206. Gates of the transistors 206 and 207 are connected to the drain of the transistor 206. Sources of the transistors 205 to 207 are connected to the ground terminal. A drain of the transistor 207 is connected to a cathode of the LED 2 via a pin T2. An input terminal of the inverter 210 is connected to a brightness control signal PWM application terminal (i.e., the pin T1). An output terminal of the inverter 210 is connected to a gate of the transistor 205.

Incidentally, in the above-structured LED driver section 20, the transistor 204, the resistor 208, and the operational amplifier 209 form a V/I conversion circuit that converts the reference voltage Vref into a reference current Ia (=Vfef/R). The transistors 202 and 203 form a first current mirror circuit that generates a mirror current Ib (=m×Ia) from the reference current Ia. The transistors 206 and 207 form a second current mirror circuit that generates a drive current To (=n×Ib=m×n× Ia) for the LED 2 from the mirror current Ib. The transistor 205 and the inverter 210 form a switch circuit that, based on the brightness control signal PWM, allows or prohibits operation of the second current mirror circuit. More specifically, when the brightness control signal PWM is high level, the transistor 205 is in an off state and the second current mirror circuit is in an operating state (state in which the second current mirror circuit is allowed to generate the drive current Io), and when the brightness control signal PWM is low level, the transistor 205 is in an on state, and the second current mirror circuit is in a non-operating state (state in which the second current mirror circuit is prohibited from generating the drive current Io).

That is, in the above-structured LED driver section 20, the transistors 202 to 207, the resistor 208, the operational amplifier 209, and the inverter 210 form a drive current generating circuit that generates the drive current To for the LED 2 by converting the reference voltage Vref into a current, and this drive current generating section is allowed to generate, or prohibited from generating, the drive current To according to the brightness control signal PWM.

Figure 2A:
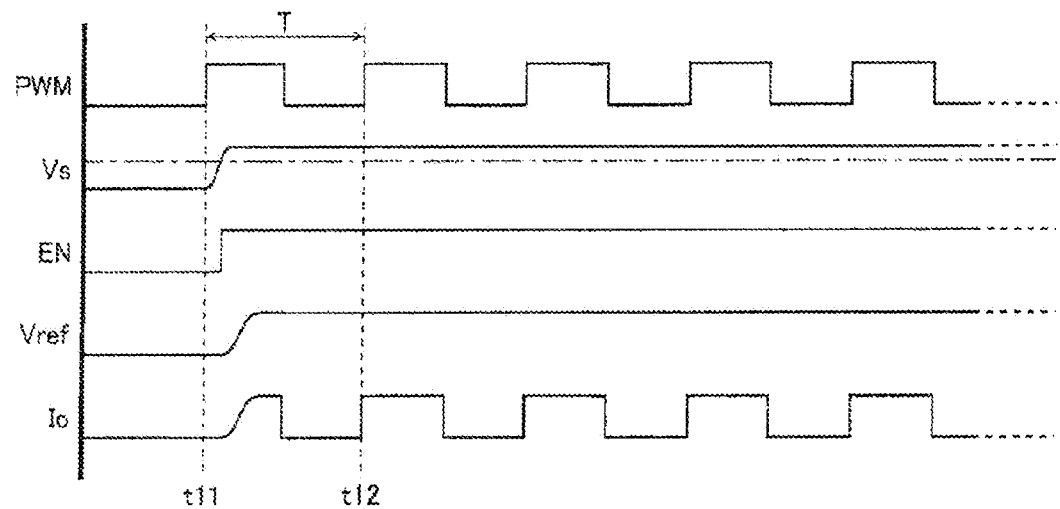
FIG. 2A is a signal waveform diagram (showing a state in which an IC is being started up) for illustrating PWM operation of the first embodiment.
Figure 2B:
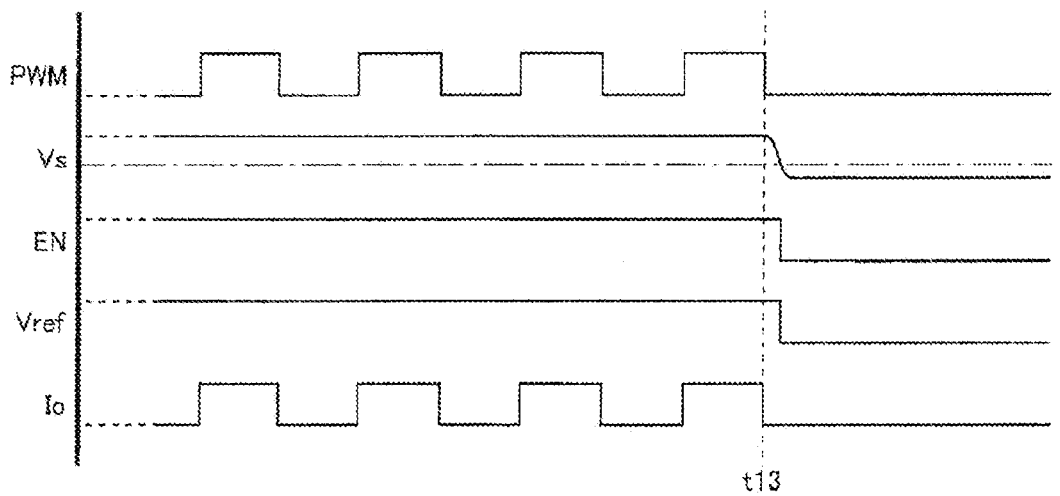
FIG. 2B is a signal waveform diagram (showing a state in which the IC is being shut down) for illustrating PWM operation of the first embodiment.

Next, PWM operation performed by the above-structured LED driver IC 1 will be described in detail, with reference to the signal waveform diagrams of FIGS. 2A and 2B. FIGS. 2A and 2B are signal waveform diagrams for illustrating the PWM operation of the first embodiment. FIG. 2A shows a state in which the IC is being started up, and FIG. 2B shows a state in which the IC is being shut down. In each figure are described the brightness control signal PWM, the smooth voltage Vs, the enabling signal EN, the reference voltage Vref, and the drive current Io, in this order from top to bottom.

First, starting operation of the IC will be described with reference to FIG. 2A. When, at time t11, the brightness control signal PWM starts to be inputted so that its voltage level is raised from low to high level, the smooth voltage Vs obtained by smoothing the brightness control signal PWM starts to rise, and when its voltage level exceeds a threshold level of the buffer 103, the enabling signal EN rises from low to high level. Incidentally, it is preferable that the threshold level of the buffer 103 be properly so set as to allow the enabling signal EN to continuously maintain itself at high level while the brightness control signal PWM is being inputted.

The reference voltage generating circuit 201 enters an operating state in response to the above-described shift of the enable signal EN to high level, and starts generating the reference voltage Vref. The reference voltage Vref, taking a predetermined rise-up time, rises up to a target voltage level, and thereafter, it is maintained at the voltage level. The drive current Io is PWM-driven according to the brightness control signal PWM, and thus brightness control of the LED 2 (mean value control of the drive current Io) is performed.

Next, shutdown operation of the IC will be described with reference to FIG. 2B. When, after the input of the brightness control signal PWM is finished at time t13, the voltage level of the brightness control signal PWM is maintained at low level, the smooth voltage Vs obtained by smoothing the brightness control signal PWM falls, and at a time when the voltage level of the smooth voltage Vs falls below the threshold level of the buffer 103, the enabling signal EN falls from high to low level. On the other hand, the reference voltage generating circuit 201, in response to the above-mentioned level shift of the enabling signal EN to low level, enters a non-operating state, and thus stops generating the reference voltage Vref.

As described above, the LED driver IC 1 of this embodiment generates, from the brightness control signal PWM externally inputted via the pin T1, the enabling signal EN that is transmitted, inside the IC, along a signal path different from a signal path along which the brightness control signal PWM is transmitted. The LED driver IC 1 performs its own on/off control (in the example of FIG. 1, generation control of the reference voltage Vref) by using the thus generated enabling signal EN, and it also controls the brightness of the LED 2 by using the PWM-driven brightness control signal PWM.

With this configuration, while the brightness control signal PWM is being inputted, the enabling signal EN can be maintained at high level and the drive current Io can be PWM-driven with the LED driver IC 1 itself maintained in an on state. Thus, the LED driver IC 1 itself does not need to be repeatedly turned on/off to control the brightness of the LED 2.

Thus, although there arises a time delay associated with the start-up of the LED driver IC 1 (in particular, the rising-up of the reference voltage Vref) when the LED driver IC 1 is started up for the first time at time t11, from time t2 onward, the drive current Io can be PWM-driven in a state in which the start-up of the LED driver IC 1 is complete, only an extremely short delay arises at the rising-up of the drive current Io, and this makes it possible to obtain the drive current Io corresponding to the on-duty of the brightness control signal PWM. Incidentally, in view of the fact that the brightness of the LED 2 is continuously carried out from time t12 onward, the rising-up delay of the drive current Io arising only at the first start-up hardly has any effect on the overall brightness control, and thus no particular problem seems to be cause by neglecting it.

Thus, with the LED driver IC 1 of this embodiment, both on/off control of the LED driver IC 1 itself and PWM driving of the LED 2 can be achieved by using a single external control signal (in FIG. 1, the brightness control signal PWM) without inviting degradation in linearity, or reduction in dynamic range, of the PWM driving. In particular, the present invention can be said to be extremely effective in increasing the frequency f (=1/T) of the PWM driving.

Figure 3:
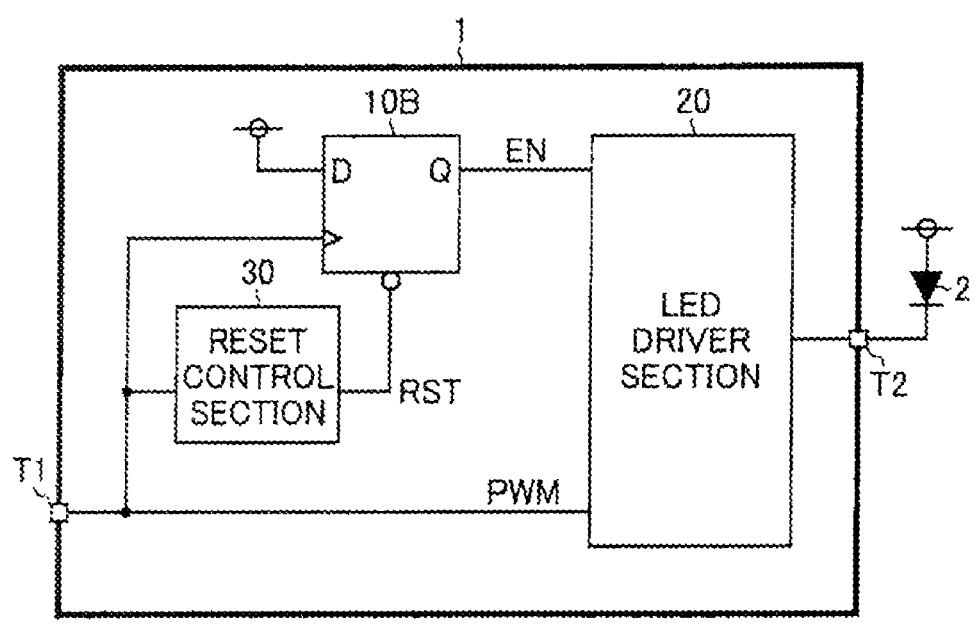
FIG. 3 is a circuit block diagram showing a second embodiment of the display device according to the present invention.

Next, a second embodiment of the display device according to the present invention will be described in detail with reference to FIG. 3. FIG. 3 is a circuit block diagram showing the second embodiment of the display device according to the present invention, and the figure shows the LED driver IC and vicinity thereof as a part particularly related to the present invention.

As shown in FIG. 3, the LED driver IC 1 of this embodiment, which has substantially the same configuration as that of the first embodiment, is featured in that, instead of the enabling control section 10A using a smoothing circuit, an enabling control section 10B using a latch circuit is incorporate therein, and in that it is further provided with a reset control section 30. Thus, the same components as those in the first embodiment are identified by the same reference numerals as in FIG. 1, thereby omitting an overlapping description, and the description below will be concentrated on the features of this embodiment.

In the LED driver IC 1 of this embodiment, the enabling control section 10B is a latch circuit that is triggered by a rising edge of the brightness control signal PWM to set the enabling signal EN to high level, and that is triggered by a rising edge of a reset signal RST to reset the enabling signal EN to low level. For example, in a case in which a D flip-flop is used as the enabling control section 10B, a data terminal (D) is connected to a high-level signal application terminal (for example, the power supply terminal), a clock terminal is connected to the pin T1, a reset terminal is connected to a reset signal RST application terminal (that is, an output terminal of the reset control section 30), and an output terminal (Q) is connected to an enabling signal input terminal of the LED driver section 20.

The reset control section 30 is means that counts time for which the brightness control signal PWM is maintained at low level, and that, when a value of the time counted thereby reaches a predetermined value, generates the reset signal RST so as to reset the enabling control signal EN. As means for counting the just-mentioned time, a counter that counts a predetermined internal clock signal is used.

Figure 4A:
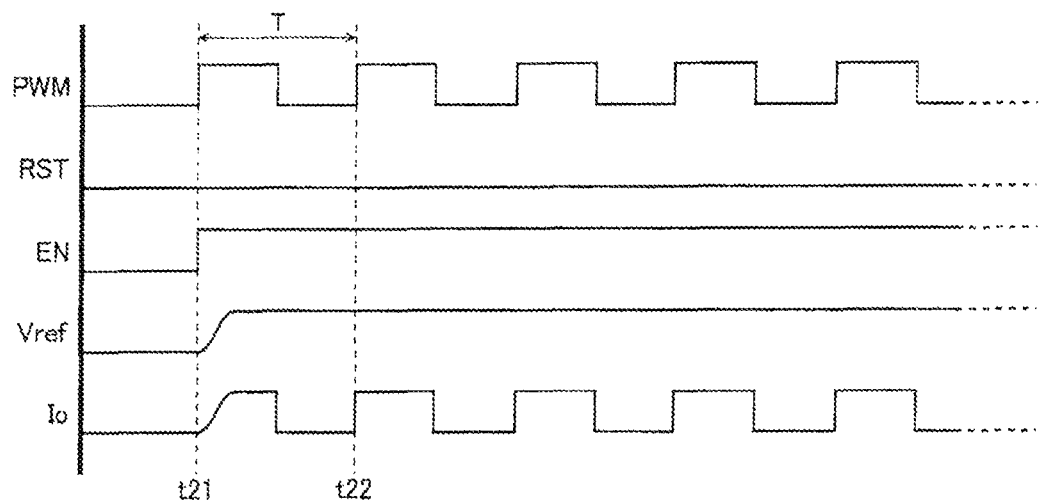
FIG. 4A is a signal waveform diagram (showing a state in which an IC is being started up) for illustrating PWM operation of the second embodiment.
Figure 4B:
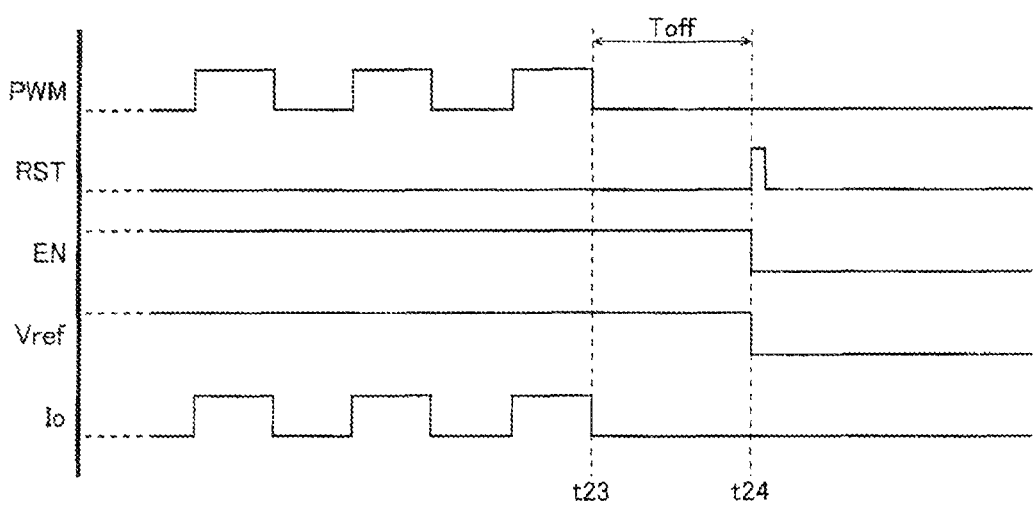
FIG. 4B is a signal waveform diagram (showing a state in which the IC is being shut down) for illustrating PWM operation of the second embodiment.

Next, a detailed description will be given of PWM operation by the LED driver IC 1 configured as described above with reference to the signal waveform diagrams of FIGS. 4A and 4B. FIGS. 4A and 4B are signal waveform diagrams for illustrating the PWM operation of the second embodiment. FIG. 4A shows a state in which the IC is being started up, and FIG. 4B shows a state in which the IC is being shut down. In each figure are described the brightness control signal PWM, the reset signal RST, the enabling signal EN, the reference voltage Vref, and the drive current Io, in this order from top to bottom.

First, start-up operation of the IC will be described with reference to FIG. 4A. When, at time t21, the brightness control signal PWM starts to be inputted so that its voltage level is raised from low to high, the enabling signal EN is triggered by the rising edge to be set to high level from low level.

The reference voltage generating circuit 201 (not shown in FIG. 3) that forms the LED driver section 20 enters an operating state in response to the above-described shift of the enabling signal EN to high level, and starts generating the reference voltage Vref. The reference voltage Vref, taking a predetermined rise-up time, rises up to a target voltage level, and is maintained at the voltage level thereafter. The drive current Io is PWM-driven according to the brightness control signal PWM, and thus brightness control of the LED 2 (mean value control of the drive current Io) is performed.

Next, shutdown operation of the IC will be described with reference to FIG. 4B. When, after the input of the brightness control signal PWM is finished at time t23, the voltage level of the brightness control signal PWM has been maintained at low level for a predetermined time Toff, the reset signal RST is raised to high level, and thereby the enabling signal EN is triggered to be reset to low level from high level. On the other hand, the reference voltage generating circuit 201 that forms the LED driver section 20, in response to the above-mentioned level shift of the enabling signal EN to low level, enters a non-operating state, and stops generating the reference voltage Vref.

As depicted above, with the LED driver IC of this embodiment, as with that of the first embodiment, while the brightness control signal PWM is being inputted, the enabling signal EN can be maintained at high level and the drive current Io can be PWM-driven, with the LED driver IC 1 itself maintained in an on state. Thus, the LED driver IC 1 itself does not need to be repeatedly turned on/off to control the brightness of the LED 2. This makes it possible to achieve, by using a single external control signal, both the on/off control of the LED driver IC 1 itself and the PWM driving of the LED 2 without inviting degradation in linearity, or reduction in dynamic range, of the PWM driving.

Figure 5:
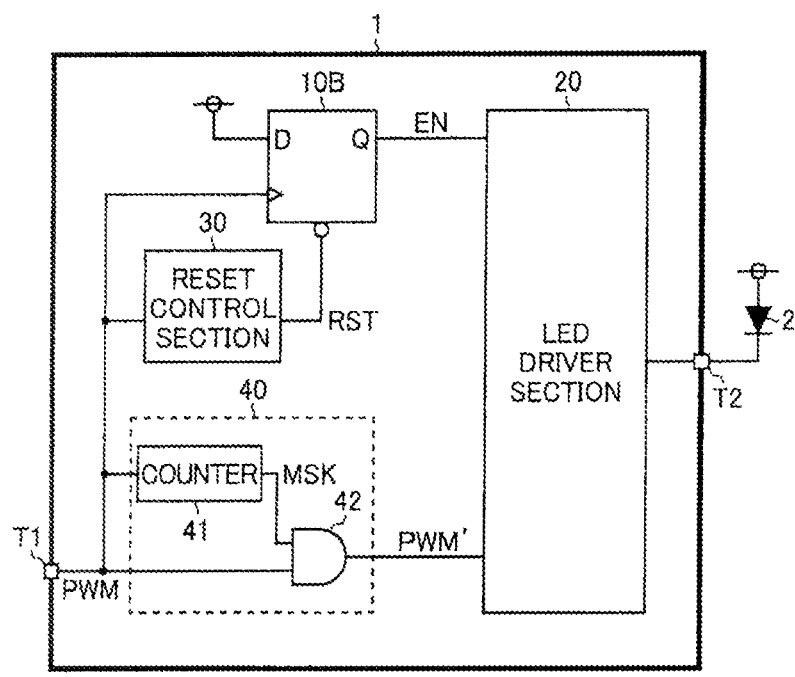
FIG. 5 is a circuit block diagram showing a third embodiment of the display device according to the present invention.

Next, a third embodiment of the display device according to the present invention will be described in detail with reference to FIG. 5. FIG. 5 is a circuit block diagram showing the third embodiment of the display device according to the present invention, and the figure shows the LED driver IC and vicinity thereof as a part particularly related to the present invention.

As shown in FIG. 5, the LED driver IC 1 of this embodiment has substantially the same configuration as that of the second embodiment, and it is featured in that a masking control section 40 is further provided. Thus the same components as those in the second embodiment are identified by the same reference numerals as in FIG. 3, thereby omitting an overlapping description, and the description below will be concentrated on the features of this embodiment.

In the LED driver IC 1 of this embodiment, the masking control section 40, which is means for prohibiting supply of the brightness control signal PWM to the LED driver section 20 until a predetermined masking time Tm has elapsed after a start of an external input of the brightness control signal PWM, is provided with a counter 41 and an AND operation unit 42. The counter 41 is means for counting a number of pulses in the brightness control signal PWM and shifting a masking signal MSK from low level to high level when the counted value reaches a predetermined value. The AND operation unit 42 is means for performing an AND operation between the brightness control signal PWM and the masking signal MSK and supplying the operation result to the LED driver section 20 as a masked brightness control signal PWM'.

Figure 6A:
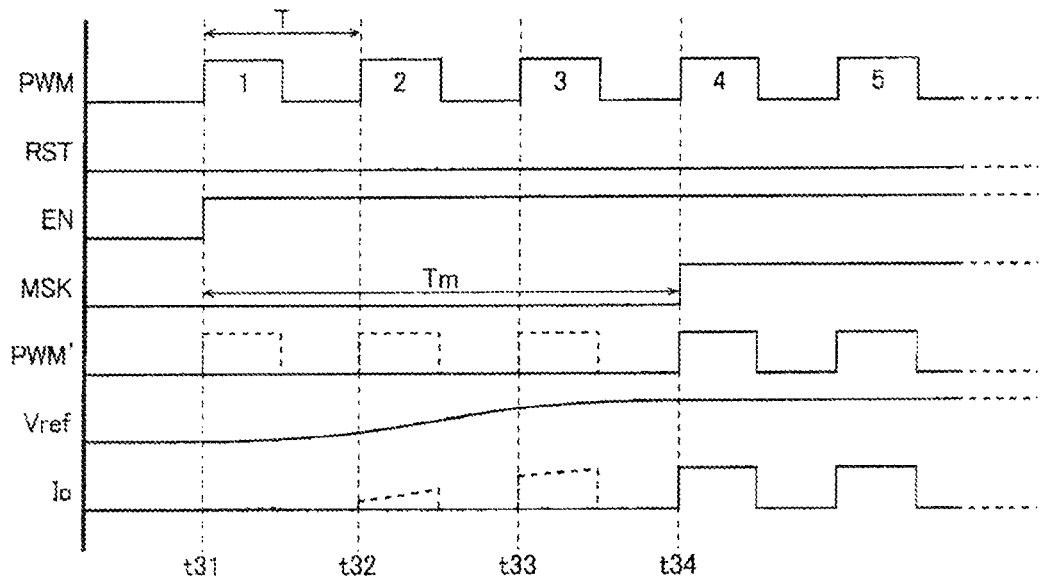
FIG. 6A is a signal waveform diagram (showing a state in which an IC is being started up) for illustrating PWM operation of the third embodiment.
Figure 6B:
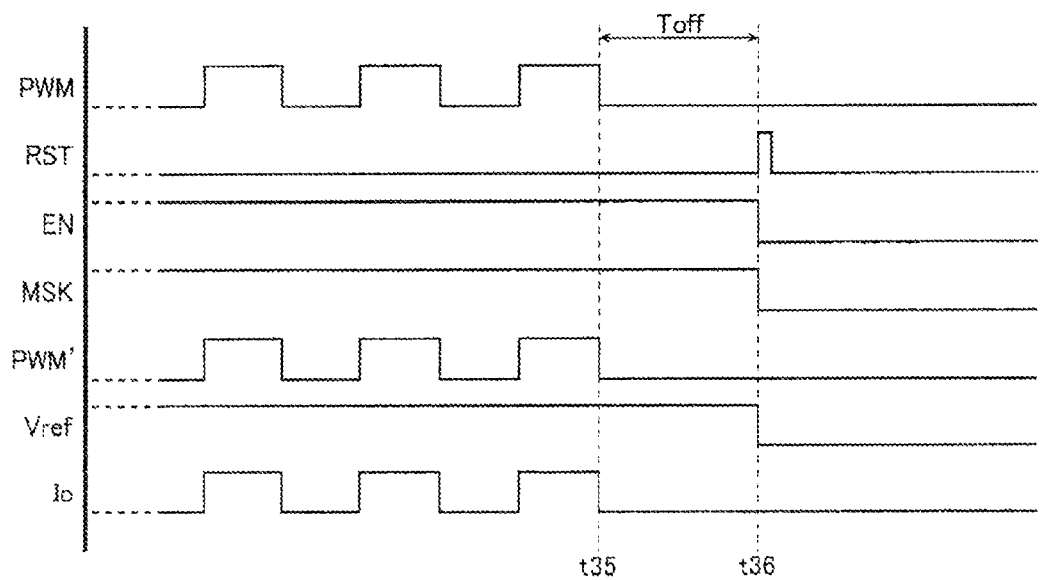
FIG. 6B is a signal waveform diagram (showing a state in which the IC is being shut down) for illustrating PWM operation of the third embodiment.
Figure 7:
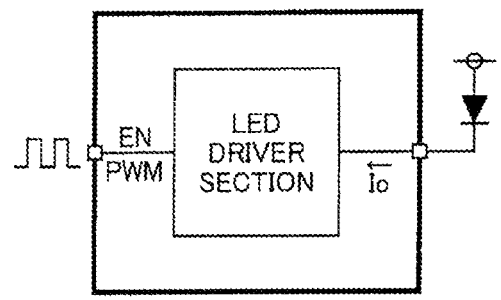
FIG. 7 is a block diagram showing a conventional example of an LED driver IC.
Figure 8:
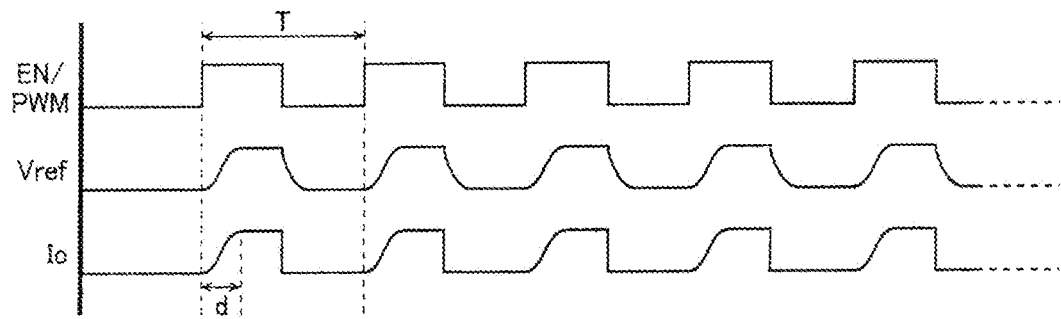
FIG. 8 is a signal waveform diagram for illustrating conventional PWM operation.
Figure 9:
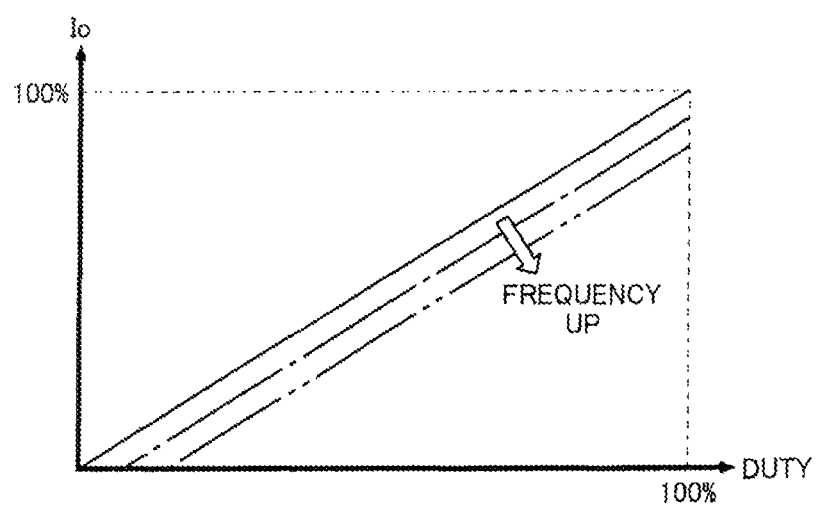
FIG. 9 is a diagram showing a correlation between a PWM duty and a drive current Io.

Next, a detailed description will be given of PWM operation by the LED driver IC 1 configured as described above with reference to the signal waveform diagrams of FIGS. 6A and 6B. FIGS. 6A and 6B are signal waveform diagrams for illustrating the PWM operation of the third embodiment. FIG. 6A shows a state in which the IC is being started up, and FIG. 6B shows a state in which the IC is being shut down. In each figure are described the brightness control signal PWM, the reset signal RST, the enable signal EN, the masking signal MSK, the masked brightness control signal PWM', the reference voltage Vref, and the driving current Io, in this order from top to bottom. Incidentally, FIG. 6A shows, as an example, a case in which time taken for the reference voltage Vref to rise up is longer than a cycle T of the PWM driving, and the masking signal MSK is raised to high level with a fourth pulse in the brightness control signal PWM.

First, the start-up operation of the IC will be described with reference to FIG. 6A. When, at time t31, the brightness control signal PWM starts to be inputted so that its voltage level is raised from low to high level, the enabling signal EN is triggered by the rising edge to be set to high level from low level. The reference voltage generating circuit 201 (not shown in FIG. 5) that forms the LED driver section 20 enters an operating state in response to the above-described shift of the enabling signal EN to high level, and starts generating the reference voltage Vref. The reference voltage Vref, taking a predetermined rise-up time, rises up to a target voltage level, and is maintained at the voltage level thereafter.

At time t31, the counter 41 counts the number of pulses in the brightness control signal PWM, and "1" is stored as a count value. Thereafter, each time a pulse is raised in the brightness control signal PWM, at time t32 and time t33, the count value is incremented to "2" and "3", respectively. Here, until the count value reaches "4", since the masking signal MSK is maintained at low level, the masked brightness control signal PWM' is maintained at low level regardless of the logic level of the externally inputted brightness control signal PWM, and thus the generation of the drive current Io at the LED driver section 20 is stopped.

Then, when, at time t34, a fourth pulse is raised in the brightness control signal PWM and the count value counted by the counter 41 reaches "4", the masking signal MSK is set from low level to high level, under a judgment that the predetermined masking time Tm has elapsed since the start of the external input of the brightness control signal PWM. As a result, the logic level of the masked brightness control signal PWM' becomes equal to that of the externally inputted brightness control signal PWM, the drive current Io starts to be PWM-driven at the LED driver section 20, and thus brightness control of the LED 2 (mean value control of the drive current Io) is performed.

Next, shutdown operation of the IC will be described with reference to FIG. 6B. When, after the input of the brightness control signal PWM is finished at time t35, the voltage level of the brightness control signal PWM has been maintained at low level for a predetermined time Toff, the reset signal RST is raised to high level, and thereby the enabling signal EN is triggered to be reset to low level from high level. On the other hand, the reference voltage generating circuit 201 that forms the LED driver section 20, in response to the above-mentioned level shift of the enabling signal EN to low level, enters a non-operating state, and stops generating the reference voltage Vref.

As described above, with the LED driver IC 1 of this embodiment, since unstable generation of the drive current To can be prohibited in the transition period when the reference voltage Vref has not reached a target voltage level, it is possible to achieve a more stable PWM driving of the LED2 (see the parts indicated by broken lines in FIG. 6A).

Incidentally, although the above description deals with, as an example, a configuration obtained by additionally providing the masking control section 40 to the configuration of the second embodiment, this is not meant to limit the configuration of the present invention, and the configuration of the first embodiment may be additionally provided with the masking control section 40.

Also, although the above description deals with a configuration which uses the AND operation unit 42 as means for connecting/disconnecting the signal path of the brightness control signal PWM, this is not meant to limit the configuration of the present invention, and an analog switch or the like may be used.

Also, although the above description deals with a configuration in which the counter 41 counts the number of pulses in the brightness control signal PWM, this is not meant to limit the configuration of the present invention, and, like in the reset control section 30, the counter 41 may count a separate internal clock signal.

Also, although the above-described first to third embodiments deal with configurations in which the present invention is applied to an LED driver IC, this is not meant to limit the application target of the present invention, and the present invention can be widely applied to load driving devices in general achieving both on/off control of the devices themselves and PWM driving of loads by using a single external control signal.

It should be understood that, other than the first to third embodiments described above, many modifications and variations are possible within the spirit of the present invention.

As hitherto described, according to the technology disclosed in this specification, it is possible to provide a load driving device capable of achieving, by using a single external control signal, both on/off control of the device itself and PWM driving of a load without inviting degradation in linearity, or reduction in dynamic range, of the PWM driving, and an illumination device and a display device using this.

The technology disclosed in this specification can be preferably applied, for example, to an LED driver IC supplying a drive current to an LED, and an illumination device and a display device using this.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A load driving device, comprising:
   an enabling control section generating an enabling signal from an externally inputted PWM signal; and
   a load driving section that is turned on/off according to the enabling signal, and that also PWM-drives the load according to the PWM signal,
   wherein the load driving section includes:
      a reference voltage generating circuit generating a predetermined reference voltage; and
      a drive current generating circuit generating a drive current for the load by converting the reference voltage into a current,
   wherein the reference voltage generating circuit is allowed to generate, or prohibited from generating, the reference voltage according to the enabling signal,
   wherein the drive current generating circuit is allowed to generate, or prohibited from generating, the drive current according to the PWM signal, and
   wherein the enabling control section is a delay circuit generating the enabling signal by delaying the PWM signal.

2. The load driving device of claim 1, wherein the delay circuit includes a lowpass filter.

3. The load driving device of claim 2, wherein the low-pass filter is a CR time constant circuit.

4. The load driving device of claim 3, wherein the delay circuit includes a buffer connected to a latter stage of the low-pass filter.

5. The load driving device of claim 1, further comprising:
   a masking control section that prohibits the PWM signal from being supplied to the load driving section for a predetermined time after a start of external input of the PWM signal.

6. The load driving device of claim 1, wherein, as the load, a light emitting device is connected to the load driving device.

7. An illumination device, comprising:
   a light emitting device serving as a light source; and
   a load driving device supplying a drive current to the light emitting device,
   wherein the load driving device includes:
      an enabling control section generating an enabling signal from an externally inputted PWM signal; and
      a load driving section that is turned on/off according to the enabling signal, and that also PWM-drives the light emitting device according to the PWM signal,
   wherein the load driving section comprises:
      a reference voltage generating circuit generating a predetermined reference voltage; and
      a drive current generating circuit generating a drive current for the load by converting the reference voltage into a current,
   wherein the reference voltage generating circuit is allowed to generate, or prohibited from generating, the reference voltage according to the enabling signal,
   wherein the drive current generating circuit is allowed to generate, or prohibited from generating, the drive current according to the PWM signal, and
   wherein the enabling control section is a delay circuit generating the enabling signal by delaying the PWM signal.

8. The illumination device of claim 7, wherein the delay circuit includes a lowpass filter.

9. The illumination device of claim 8, wherein the low-pass filter is a CR time constant circuit.

10. The illumination device of claim 9, wherein the delay circuit includes a buffer connected to a latter stage of the low-pass filter.

11. The illumination device of claim 7, wherein the load driving device further comprises:
    a masking control section that prohibits the PWM signal from being supplied to the load driving section for a predetermined time after a start of external input of the PWM signal.

12. A display device, comprising:
    a liquid crystal panel; and
    an illumination device illuminating the liquid crystal panel,
    wherein the illumination device comprises:
       a light emitting device serving as a light source; and
       a load driving device supplying a drive current to the light emitting device, wherein the load driving device comprises:
          an enabling control section generating an enabling signal from an externally inputted PWM signal; and
          a load driving section that is turned on/off according to the enabling signal, and that also PWM-drives the light emitting device according to the PWM signal,
       wherein the load driving section includes:
          a reference voltage generating circuit generating a predetermined reference voltage; and
          a drive current generating circuit generating a drive current for the load by converting the reference voltage into a current,
       wherein the reference voltage generating circuit is allowed to generate, or prohibited from generating, the reference voltage according to the enabling signal,
       wherein the drive current generating circuit is allowed to generate, or prohibited from generating, the drive current according to the PWM signal, and
       wherein the enabling control section is a delay circuit generating the enabling signal by delaying the PWM signal.

13. The display device of claim 12, wherein the delay circuit includes a low-pass filter.

14. The display device of claim 13, wherein the low-pass filter is a CR time constant circuit.

15. The display device of claim 4, wherein the delay circuit includes a buffer connected to a latter stage of the low-pass filter.

16. The illumination device of claim 12, wherein the load driving device further comprises:

a masking control section that prohibits the PWM signal from being supplied to the load driving section for a predetermined time after a start of external input of the PWM signal.

* * * * *